Patented Mar. 11, 1952

2,588,407

UNITED STATES PATENT OFFICE 2,588,407

INSECT REPELLENT

Melvin S. Newman, Columbus, Ohio, and Barney J. Magerlein, Kalamazoo, Mich., assignors to the United States of America as represented by the Secretary of the Army No Drawing. Application December 29, 1948, Serial No. 68,045

6 Claims. (Cl. 167—33)

This invention relates to insect repellents.

We have found that the application of 4-hydroxymethyl-2-methyl-2-phenyl - 1,3 - dioxolane, which compound has the structural formula

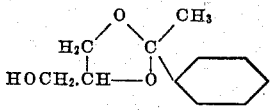

to the human skin affords effective protection against insect bits, by repelling insects, particularly the malaria-carrying Aedes aegypti.

A number of tests to measure the repellency of 4 - hydroxymethyl - 2 - methyl - 2 - phenyl - 1,3- dioxolane against Aedes aegypti was conducted by smearing the compound on the arms of test personnel, who then thrust their arms into cages containing Aedes aegypti. The arms were exposed for 30-minute intervals at 3 minutes each until the first insect bite.

It was found that the application of 4-hydroxymethyl-2-methyl-2-phenyl-1,3-dioxolane affords protection against Aedes aegypti for 242 minutes. Against Anopheles quadrimaculatus, an average repellency time of 33 minutes was noted in analogous tests.

For ease of application to the skin, the 4-hydroxymethyl-2-methyl-2-phenyl - 1,3 - dioxolane may be incorporated in a suitable inert liquid or solid carrier such as mineral oil, alcohol, petrolatum, etc.

Having thus described our invention, we claim:

1. An insect repellent composition comprising 4 - hydroxymethyl - 2 - methyl - 2 - phenyl - 1,3- dioxolane in a non-gaseous inert organic carrier.

2. An insect repellent composition comprising 4 - hydroxymethyl - 2 - methyl - 2 - phenyl - 1,3- dioxolane in oil.

3. An insect repellent composition comprising 4 - hydroxymethyl - 2 - methyl - 2 - phenyl - 1,3- dioxolane in alcohol.

4. An insect repellent composition comprising 4 - hydroxymethyl - 2 - methyl - 2 - phenyl - 1,3- dioxolane in petrolatum.

5. A process of repelling insects comprising applying 4 - hydroxymethyl-2-methyl-2-phenyl-1,3-dioxolane to the region from which the insects are to be repelled.

6. A process of repelling insects comprising applying 4 - hydroxymethyl-2-methyl-2-phenyl-1,3-dioxolane to the skin.

MELVIN S. NEWMAN.
BARNEY J. MAGERLEIN.

REFERENCES CITED

The following references are of record in the file of this patent:

UNITED STATES PATENTS

| Number | Name | Date |
| --- | --- | --- |
| 2,492,692 | Drake | Dec. 27, 1949 |

OTHER REFERENCES

Newman et al.: "Some New Compounds as Possible Insect Repellants."

J. Am. Chem. Soc., October 1946, pp. 2112–2115, p. 2113, Orlando No. 7414 (4-Hydroxymethyl-2-propyl 1,3-dioxolane). 167–12.